United States Patent [19]

Sato

[11] Patent Number: 5,334,102

[45] Date of Patent: Aug. 2, 1994

[54] CONTROL SYSTEM FOR CONTINUOUSLY VARIABLE TRANSMISSION

[75] Inventor: Keiji Sato, Musahino, Japan

[73] Assignee: Fuji Jukogyo Kabushiki Kaisha, Tokyo, Japan

[21] Appl. No.: 957,806

[22] Filed: Oct. 8, 1992

[30] Foreign Application Priority Data

Oct. 11, 1991 [JP] Japan .................. 3-292349

[51] Int. Cl.$^5$ .................. F16H 61/06; F16H 61/18
[52] U.S. Cl. .................. 474/18; 474/28; 474/70
[58] Field of Search .................. 474/18, 28, 70, 77, 474/69

[56] References Cited

U.S. PATENT DOCUMENTS

| 4,547,178 | 10/1985 | Hayakawa et al. | 474/11 |
| 4,589,071 | 5/1986 | Yamamuro et al. | 474/18 X |
| 4,782,934 | 11/1988 | Takano et al. | 74/866 X |

FOREIGN PATENT DOCUMENTS

| 228263 | 12/1986 | European Pat. Off. |
| 228884 | 12/1986 | European Pat. Off. |
| 412758 | 8/1990 | European Pat. Off. |
| 3-189466 | 8/1991 | Japan |

OTHER PUBLICATIONS

Search Report of British Patent Office dated Dec. 16, 1992.

*Primary Examiner*—Ramon S. Britts
*Assistant Examiner*—Roger J. Schoeppel
*Attorney, Agent, or Firm*—Beveridge, DeGrandi, Weilacher & Young

[57] ABSTRACT

A control system for a belt-type continuously variable transmission of a motor vehicle, having a primary and a secondary control valve for varying the transmission ratio. The primary control valve receives an electric signal from a control unit to vary a primary hydraulic pressure. The primary control valve produces a primary pressure which causes the transmission to take an intermediate transmission ratio when the electric signal is not transmitted due to a failure such as breakage of a cable. Thus, dangerous situations of the vehicle are prevented, and the vehicle can reliably start in a relatively low speed range of the transmission.

8 Claims, 3 Drawing Sheets

CONTROL SYSTEM FOR CONTINUOUSLY VARIABLE TRANSMISSION

BACKGROUND OF THE INVENTION

The present invention relates to a control system for a continuously Variable transmission (CVT) for a motor vehicle, and more particularly, relates to a fail-safe system for the CVT in case of a speed change signal defect.

In recent years, control systems for a continuously variable transmission, including control valves for secondary and primary pressures, are electronically operated. Further, transmission ratio control is intended to be optimized by using the secondary pressure according to transmission torque and by using the primary pressure according to various driving and traveling conditions. An electronic control system of the above type has been proposed, the system having a secondary control valve in the form of a relief valve having a proportional electromagnetic solenoid and a primary control valve in the form of a pressure reducing valve having a proportional electromagnetic solenoid. The secondary control valve releases a part of the pump discharge pressure in accordance with a solenoid current and proportionally controls the secondary pressure to a predetermined value. On the other hand, the primary control valve reduces the primary pressure in accordance with a solenoid current and proportionally controls the primary pressure to a desired value.

Since the above-mentioned continuously variable transmission electronically controls the primary and secondary pressures by using electric signals, the transmission is provided with a fail-safe function against such defects as breakage of cables and solenoids. The primary control valve for changing the transmission ratio is a proportional electromagnetic pressure reducing valve of pressure feedback type. Thus, when no electric current flows, the primary pressure becomes maximum or minimum depending on the characteristics of the primary control valve so that the transmission will be forcedly shifted up or down, respectively. Consequently, as the fail-safe operation, such speed change situations should also be considered so as to enable the transmission ratio to be safely conducted.

Japanese Patent Application Laid-Open No. 91-189466 discloses an electronic control system for the above-mentioned continuously variable transmission, with respect to fail-safe countermeasures against no-electric current state of the primary control valve for changing the transmission ratio. The proportional electromagnetic pressure reducing valve is of a pilot-controlled pressure feedback type. While the vehicle is traveling, if the electric current is stopped and the primary pressure decreases to a minimum level, then clamp force will be reduced so that belt slippage will occur or the transmission will be abruptly shifted down, causing a wheel lock. To prevent such occurrences, the characteristics of the valve are determined such that if no-current state takes place, the primary pressure will become maximum and thereby the transmission will be shifted to the highest position.

Nevertheless, in the above-mentioned prior art, the transmission ratio is controlled in such a way that when the electric current is stopped the primary pressure will be forcibly increased to a maximum level and the transmission ratio will be fixed to a minimum level. In the prior art, although such occurrences as belt slippage and wheel lock are prevented, the start-up characteristics are remarkably deteriorated since the vehicle must be started with the minimum transmission ratio of the transmission. In addition, in such a start-up condition, the clutch may be damaged or excessively heated. Thus, the durability of the clutch is deteriorated.

SUMMARY OF THE INVENTION

The present invention is made in view of the above-mentioned occurrences, and an object of the present invention is to improve the start-up characteristics in a transmission ratio control system which shifts the continuously variable transmission to a high transmission ratio position where no electric current flows due to a defect of a primary control valve.

According to the present invention, a control system for a continuously variable transmission has a primary pulley operatively connected to an engine, a secondary pulley operatively connected to vehicle wheels, a belt wound around both the primary and secondary pulleys for transmitting a power of the engine to the vehicle wheels, a primary cylinder provided on the primary pulley and a secondary cylinder provided on the secondary pulley, the control system comprising a primary control valve for producing a primary control pressure for the primary cylinder, a secondary control valve for producing a secondary control pressure for the secondary cylinder, control means connected to the primary and secondary control valves for changing the primary and secondary control pressures so as to change the transmission ratio of the transmission, and the primary control valve having means for receiving an electric signal from said control means, the control system comprising setting means for setting the primary control pressure to an intermediate transmission ratio when the means for receiving an electric signal is inoperative.

According to the present invention, should electric current not flow in the devices for receiving an electric signal due to breakage of a signal cable or to a failure of the signal receiving means, the transmission is controlled to take an intermediate transmission ratio at which no emergency braking takes place. Thus, an abrupt behavior of a vehicle such as belt slippage, wheel lock, and so forth is prevented. In addition, the start-up characteristics of the vehicle are remarkably improved. The intermediate transmission ratio can vary in accordance with an input torque. Therefore, the traveling characteristics can be improved.

Preferred embodiments of the present invention will become understood from the following detailed description referring to the accompanying drawings.

DESCRIPTION OF PREFERRED EMBODIMENTS

Figure 1:
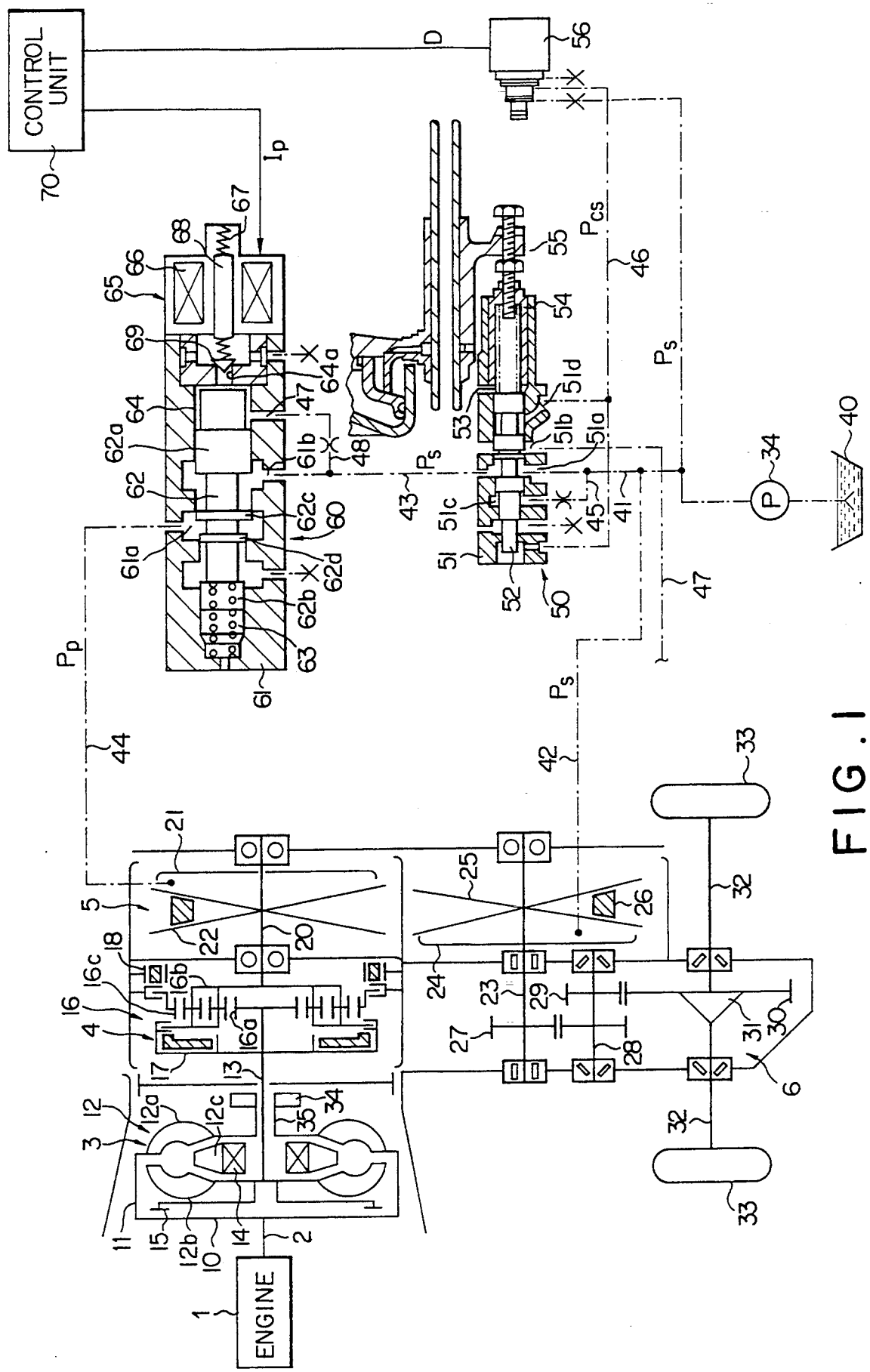
FIG. 1 is a diagrammatic view showing an embodiment of a control system for a continuously variable transmission in accordance with the present invention.

Embodiments of the present invention will be described with reference to the accompanying drawings. Referring to FIG. 1, the power of an engine 1 is transmitted to a continuously variable transmission 5 through a torque converter unit 3 and a forward-reverse switching unit 4. The output torque of the transmission 5 is transmitted to a differential unit 6.

In the torque converter unit 3, a crank shaft 2 of the engine is connected to a converter cover 11 and a pump impeller 12a of a torque converter 12 through a drive plate 10. A turbine runner 12b of the torque converter 12 is connected to a turbine shaft 13. A stator 12c is guided by a one-way clutch 14. A lock-up clutch 15 fixed to the turbine runner 12b is engageable with or releasable from the drive plate 10. The lock-up clutch 15 transmits the torque of the engine 1 through the torque converter 12 or the lock-up clutch 15.

The forward-reverse switching unit 4 has a double-pinion planetary gears 16. The turbine shaft 13 is connected to a sun gear 16a and the torque thereof is transmitted to a primary shaft 20 through a carrier 16b of the planetary gears 16. A forward clutch 17 is disposed between the sun gear 16a and a ring gear 16c. A reverse brake 18 is disposed between the ring gear 16c and a casing of the planetary gears 16. When the forward clutch 17 is engaged, the sun gear 16a and the carrier 16b of the planetary gears 16 are integrally fixed. Thus, the turbine shaft 13 and the primary shaft 20 are directly connected. On the other hand, when the reverse brake 18 is connected, the torque is reversely transmitted to the primary shaft 20. When the forward clutch 17 and the reverse brake 18 are released, the planetary gears 16 become idle.

In the transmission 5, the primary shaft 20 is provided with a variable primary pulley 22 having a primary hydraulic cylinder 21 and a secondary shaft 23 with a secondary pulley 25 having a secondary hydraulic cylinder 24 which is similar to the hydraulic cylinder 21. A belt 26 is wound around and between the primary pulley 22 and the secondary pulley 25. The pressure receiving area of the primary cylinder 21 is larger than that of the secondary cylinder 24. A continuously variable transmission ratio change is accomplished, as is known in the art, by changing the ratio of radii of the drive belt 26 on the primary pulley 22 and the secondary pulley 25 in accordance with the primary pressure in the hydraulic cylinder 21.

In the differential unit 6, an output shaft 28 is connected to the secondary shaft 23 through a pair of reduction gears 27. A drive gear 29 on the output shaft 28 is engaged with a final gear 30. A differential gear 31 provided with the final gear 30 is connected to left and right wheels 33 of the vehicle through an axle 32.

On the other hand, to provide a hydraulic fluid source for controlling the continuously variable transmission, an oil pump 34 is disposed adjacent to the torque converter 12. The oil pump 34 is connected to the converter cover 11 through a pump drive shaft 35 so that the motion of the engine 1 always drives the pump 34 and thereby a hydraulic pressure is generated. In the continuously variable transmission 5, the hydraulic pressure is widely controlled from low level to high level, so that the oil pump 34 is of a variable capacity, roller vane type and has a plurality of suction and discharge ports.

A transmission control system of hydraulic control type will be described below. An oil path 41 from an oil reservoir 40 has the oil pump 34 and is connected to a secondary control valve 50 so that a predetermined secondary pressure Ps is produced. The secondary pressure Ps is always supplied to the secondary cylinder 24 through an oil path 42. The secondary pressure Ps is led to a primary control valve 60 through an oil path 43. The oil is charged into or discharged from the primary cylinder 21 through an oil path 44 so that a primary pressure Pp is controlled.

The secondary control valve 50 is of a pressure control type using a duty signal. A spool 52 is inserted into a valve main body 51. One end of the spool 52 is connected to a sensor shoe 55 operatively connected to the primary pulley through a spring 53 and a bush 54. Thus, the spring force is applied to the valve main body 51 in accordance with the transmission ratio. On the other hand, to a port 51c remote from the spring 53 of the spool 52, the secondary pressure Ps of an oil path 45 is applied. In addition, the secondary control valve 50 is also provided with a duty solenoid valve 56 to which the secondary pressure Ps of the oil path 41 is applied. A control pressure Pcs is produced from the secondary pressure Ps as the source pressure, in accordance with a duty signal D from a control unit 70. The control pressure Pcs is applied to the spool 52 through an oil path 46 and a port 51d. The spool 52 is stroked in accordance with the relation among the spring force, the secondary pressure Ps, and the control pressure Pcs, in such a manner that the oil of a port 51a is drained to a drain port 51b so as to obtain the predetermined secondary pressure Ps.

The primary control valve 60 is a proportional electromagnetic pressure reducing valve of a pilot controlled pressure feedback type. A spool 62 is inserted into a valve main body 61. One end of the spool 62 is acted upon by a spring 63. The other end of the spool 62 has a control chamber 64. The control chamber 64 is associated with an electromagnetic relief valve 65. The spool 62 ham a large diameter land 62a on the side of the control chamber 64 and a small diameter land 62b on the side of the spring 63. In addition, the spool 62 has lands 62c and 62d of the same sizes as the lands 62a and 62b, respectively. In a hydraulic chamber 61a connected to the oil path 44, the primary pressure Pp is applied to both the lands 62c and 62d. The reaction force of the primary pressure Pp is applied in the same direction as the force of the spring 63. The secondary pressure Ps in the oil path 43 is always applied to a port 61b. Thus, the secondary pressure Ps is reduced and thereby the predetermined primary pressure Pp is produced.

The electromagnetic relief valve 65 is provided in such a way that a plunger 68 acted upon by a spring 67 is attracted to a proportional solenoid 66 by electromagnetic force. A spring loaded valve member 69 of the plunger 68 is disposed at a drain port 64a of the control chamber 64. The control chamber 64 is connected to an oil path 47 branched from the oil path 43 so as to receive the secondary pressure through an orifice 48. In accordance with the electromagnetic force of the proportional solenoid 66, a control pressure Pc is produced in the control chamber 64 from the secondary pressure Ps as the source pressure. Thus, the set pressure of the spool 62 can be varied.

The spool 62 balances the reaction force of the primary pressure Pp applied to the difference $\Delta S$ of pressure receiving areas of the lands 62c and 62d and the force F of the spring 63, with the force of the control pressure Pc applied to the area S1 of the land 62a. This balance formula is expressed as follows.

$$Pc \cdot S1 = Pp \cdot \Delta S + F$$

On the other hand, the electromagnetic relief valve 65 produces an actuating force (Fo−K·Ip) where Fo is the force of the spring 67, Ip is the solenoid current, and K is a constant. Thus, the valve member 69 varies the opening area Sc of the port 64a, thereby producing the control pressure Pc. Thus, the following equation is satisfied.

$$Pc \cdot Sc = Fo - K \cdot Ip$$

Thus, the primary pressure Pp is expressed by the following formula with respect to the solenoid current Ip.

$$Pp = (Fo - K \cdot Ip) \cdot S1 / (Sc \cdot \Delta S) - F/\Delta S$$

Figure 2:
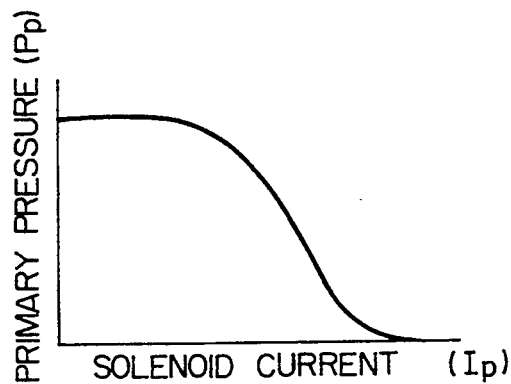
FIG. 2 is a graph showing a characteristics curve of a primary control valve.

In other words, the control pressure Pc is reversely proportional to the solenoid current Ip. On the other hand, the primary pressure Pp is proportional to the control pressure Pc. Thus, as shown in FIG. 2, as the solenoid current Ip increases, the primary pressure Pp decreases linearly, or just proportionally. With the characteristic where the solenoid current Ip is reversely proportional to the primary pressure Pp, there is provided a fail-safe function where in the event of no-electric current, the transmission 5 is shifted up to the high speed position.

Figure 3A:
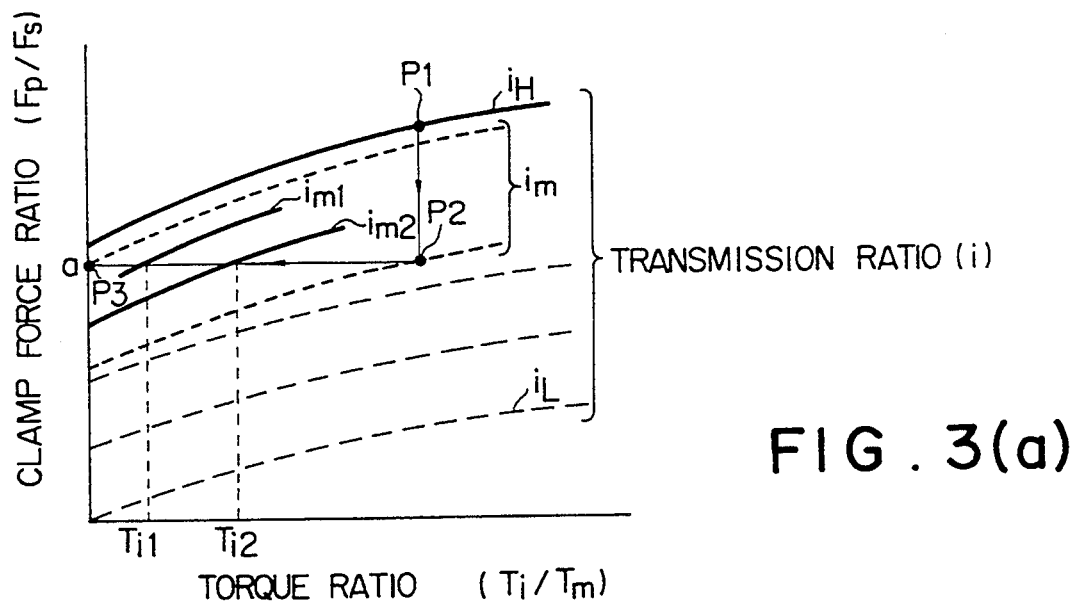
FIGS. 3(a), 3(b) and 3(c) are graphs showing characteristics of clamp force ratio of primary and secondary valves, primary clamp force, and a speed change pattern respectively.
Figure 3B:
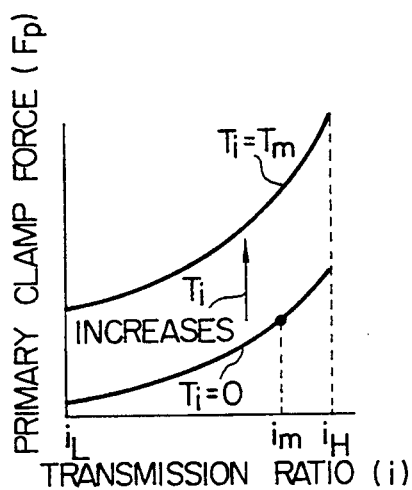

Next, the fail-safe transmission ratio control in the no-electric current state will be described. In a continuously variable transmission of push belt type, there is a relation, as shown in FIG. 3(a), between the clamp force ratio Fp/Fs and the torque ratio Ti/Tm where Fp is a primary clamp force exerted by the primary cylinder 21, Fs is a secondary clamp force exerted by the secondary cylinder 24, Ti is an input torque, and Tm is a transmittable torque at a particular transmission ratio and at a particular hydraulic pressure. In other words, the transmission ratio i where the ratio of primary pressure and secondary pressure, Pp/Ps, is kept at a particular value, can be predicted based on the input torque Ti at that point. In addition, in the case of the pull type belt, the transmission ratio can be predicted by the pressure ratio and the input torque although they vary to some extent belt by belt. Thus, by setting a maximum primary pressure Ppmax relative to a maximum secondary pressure Psmax determined on the basis of the belt slipping limit, the transmission ratio in no-electric current state can be set to an intermediate transmission ratio im. The relation shown in FIG. 3(a) can be represented with respect to the relation between the transmission rate i and the primary clamp force Fp as shown in FIG. 3(b).

Figure 3C:
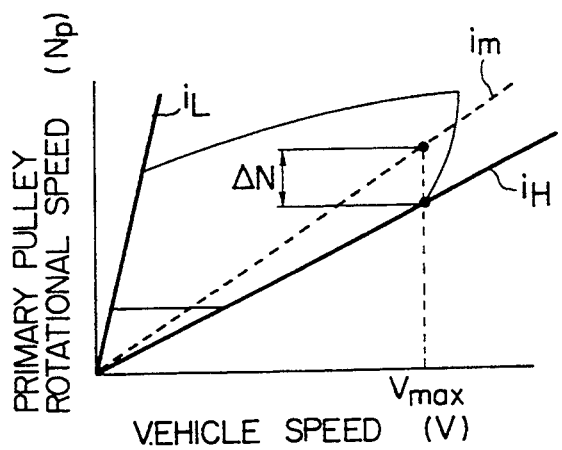

When considering the characteristics required for the vehicle in no-electric current state, the down-shift operation where an abrupt braking takes place in the no-electric current state should be avoided. In other words, the rise of the rotational speed of the engine should be equal to or below a value ΔN in the transmission ratio pattern shown in FIG. 3(c) showing a relation between the vehicle speed V and the primary pulley rotational speed Np. Thus, to allow the engine rotational speed to rise by ΔN in obtaining a maximum vehicle speed Vmax at a minimum transmission ratio iH in the normal traveling, sufficient transmission ratio is an intermediate speed change ratio im. Moreover, when considering the start-up and traveling characteristics, a low speed position of the transmission 5 is desirable. However, when the transmission ratio is set in a range from 2.5 to 0.5, for example, a practical value of the intermediate transmission ratio im for satisfying such condition should desirably be in a range from 0.75 to 0.9.

In the above-mentioned conditions, the clamp force ratio a in the intermediate transmission ratio im in the case where the input torque Ti is zero can be obtained on the diagram of FIG. 3(a). The maximum primary pressure Ppmax 13 is calculated in accordance with the clamp force ratio a, the maximum secondary pressure Psmax at the belt slip limit, and the primary-secondary pressure receiving area ratio Ap/As (=2). Next, the force of the spring 67 of the electromagnetic relief valve 65 is set so that when the solenoid current Ip is zero in the no-electric current state, the maximum primary pressure Ppmax will be obtained.

The operation of this embodiment will be described below. First, when the engine 1 is started up, the oil pump 34 is driven through the converter cover 11 of the torque converter 12 and the pump drive shaft 35 and thereby a hydraulic pressure is produced. This hydraulic pressure is applied to the secondary control valve 50. The desired transmission ratio of the transmission ratio control system in the vehicle stop state is set to for example 2.5 as a theoretical maximum transmission ratio of the transmission 5.

A corresponding solenoid current Ip flows to the proportional solenoid 66 of the primary control valve 60. Thus, the primary control valve 60 is moved to the drain position so that the primary pressure Pp is not produced. Therefore, the secondary pressure Ps of the secondary control valve 50 is supplied only to the secondary cylinder 24. The transmission 5 is shifted to a low speed position having a maximum transmission ratio iL.

At this time the lockup clutch 15 is released by an hydraulic control system (not shown) and the oil is supplied to the torque converter 12. When the transmission 5 is shifted to a drive range, the forward clutch 17 of the forward-reverse switching unit 4 is engaged by the supplied oil. Thus, the forward-reverse switching unit 4 is placed in the forward position. Therefore, the motion of the engine 1 is transmitted to the primary shaft 20 of the transmission 5 through the torque converter 12 and the forward-reverse switching unit 4. The torque at the maximum transmission ratio is transmitted to the secondary shaft 23 through the primary pulley 22, the secondary pulley 25, and the belt 26. Then, the torque is transmitted to the wheels 33 through the differential unit 6. Thus, the vehicle can start.

On the other hand, in the secondary pressure control system, when the accelerator pedal is depressed and the vehicle begins to travel, a duty signal in accordance with the input torque Ti and so forth is input to the duty solenoid valve 56. Thus, a predetermined control pressure is produced. When the input torque Ti is large at the start of the vehicle, a high control pressure Pcs is applied to the spool 52 of the secondary control valve 50 so as to decrease the amount of draining. In such a way, the secondary pressure Ps is increased. Thereafter, when the speed change operation is started and the transmission ratio is decreased while the lockup clutch 15 is connected, the control pressure Pcs decreases. Thus, the draining amount of the secondary control valve 50 increases and the secondary pressure Ps gradually decreases. Consequently, the secondary pressure control system is operated in such a way to maintain a minimum pulley pushing force which does not cause belt slippage at the transmitted torque.

The secondary pressure Ps is led to the primary control valve 60. The primary control valve 60 reduces the secondary pressure Ps to the primary pressure Pp for controlling the transmission ratio. In other words, at the maximum transmission ratio iL taken at the start-up of the vehicle, a corresponding large solenoid current Ip flows to the proportional solenoid 66 of the electromagnetic relief valve 65 of the primary control valve 60. Thus, the plunger 68 is retracted and the pushing force of the valve member 69 is decreased. Thus, the control pressure Pc decreases so that the primary pressure Pp is significantly decreased due to the difference in the areas of the lands 62c and 62d of the spool 62. When the transmission ratio changing operation is started, the solenoid current Ip gradually decreases. In the primary control valve 60, as the electromagnetic force of the proportional solenoid 66 of the electromagnetic relief valve 65 decreases, the pushing force of the valve member 69 increases, thereby raising the control pressure Pc. The spool 62 is successively stroked to the left and the amount of oil supplied increases. Thus, the primary pressure Pp is successively increased, so that the belt 26 moves toward the primary pulley 22 and the transmission 5 is shifted up to a high speed position where the transmission ratio is small. When the solenoid current Ip decreases to a minimum level, the control pressure Pc of the primary control valve 60 increases. As a result, the primary pressure Pp increases to a maximum level and the state of the minimum transmission ratio iH is maintained.

Contrary to the above, when the vehicle is decelerated or accelerated, the solenoid current Ip is increased. Accordingly, the primary pressure Pp remarkably decreases. Thus, the belt 26 is moved toward the secondary pulley 25 and the transmission 5 is shifted down. In this manner with the primary pressure Pp, the transmission ratio is changed in a stepless way in the entire transmission ratio range between the maximum transmission ratio iL and the minimum transmission ratio iH. When the primary pressure Pp deviates from the desired value, the stroke of the spool 62 is changed by the reaction force of the hydraulic pressure of the hydraulic chamber 61a in the primary pressure control valve 60. Thus, the self-feedback operation is performed.

When the electric current stops in the solenoid 66 of the primary control valve 60 due to a breakage of a cable or the like during the traveling of the vehicle under the above-mentioned transmission ratio control, the electromagnetic relief valve 65 is set to a predetermined control pressure Pc by the spring 67. In other words, the force of the spring 67 is set so that the intermediate transmission ratio im is maintained while the primary-secondary clamp force ratio Fp/Fs is kept constant against the torque ratio Ti/Tm. Thus, when the input torque Ti is large, the transmission 5 is shifted down from the minimum transmission ratio iH shown at P1 in FIG. 3(a) to an intermediate transmission ratio im shown at P2 in FIG. 3(a). Therefore, rapid deceleration and blow-up of the engine due to abrupt down-shift operation during high speed traveling can be prevented. Thus, high speed rotation of the wheels is maintained, and such occurrences as wheel locking and spinning are prevented. When the input torque Ti decreases, the transmission 5 is shifted up from the transmission ratio shown at P2 in FIG. 3(a) to an intermediate transmission ratio im shown at P3. Consequently, abrupt operation of the engine brake is prevented.

When the vehicle starts in such a defective state, the transmission 5 is controlled to shift to a predetermined transmission ratio in accordance with the input torque Ti on the line between the points P2 and P3 of the intermediate transmission ratio im. More specifically, when the input torque is low and equal to Til, the transmission 5 is shifted up to a relatively high intermediate transmission ratio iml, while when the input torque is larger and equal to Ti2, the transmission 5 is shifted down to a relatively low intermediate transmission ratio im2. As the input torque Ti increases, the intermediate transmission ratio im will also increase. Thus, the vehicle can be easily started up.

Figure 4:
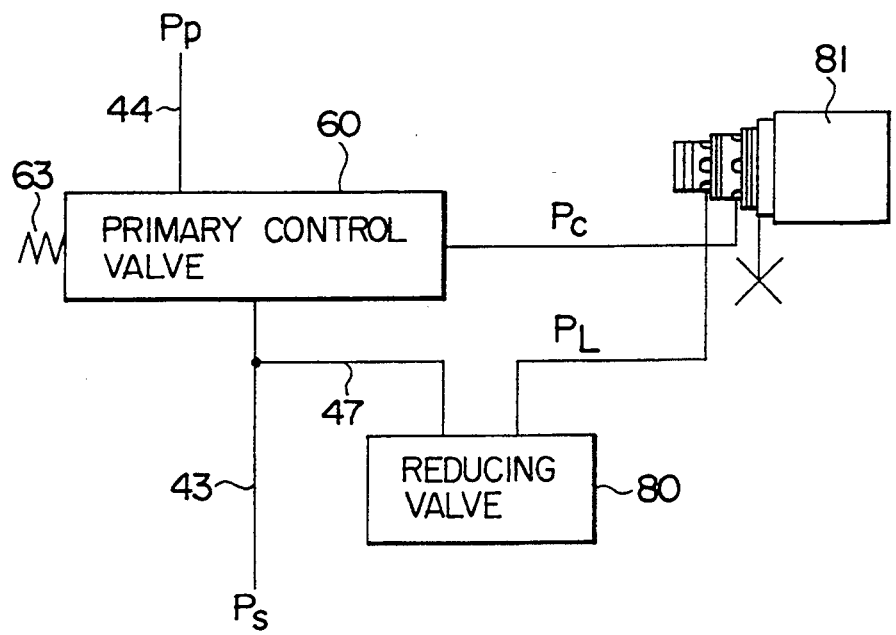
FIG. 4 is a schematic diagram showing a part of a second embodiment of the present invention.

Next, with reference to FIG. 4, a second embodiment of the present invention will be described. In this embodiment, a pilot oil path 47 of the primary control valve 60 is provided with a reducing valve 80 which produces a particular reducing pressure $P_L$. With the source pressure of the reducing pressure $P_L$, a solenoid valve 81 produces a control pressure Pc. In this case, in consideration of the reducing pressure $P_L$, the force of the spring 63 of the primary control valve 60 is set to produce the same function as that of the first embodiment.

As the pressure feed-back primary control valve, a direct drive type valve may be used for the above-mentioned pilot type.

Figure 5:
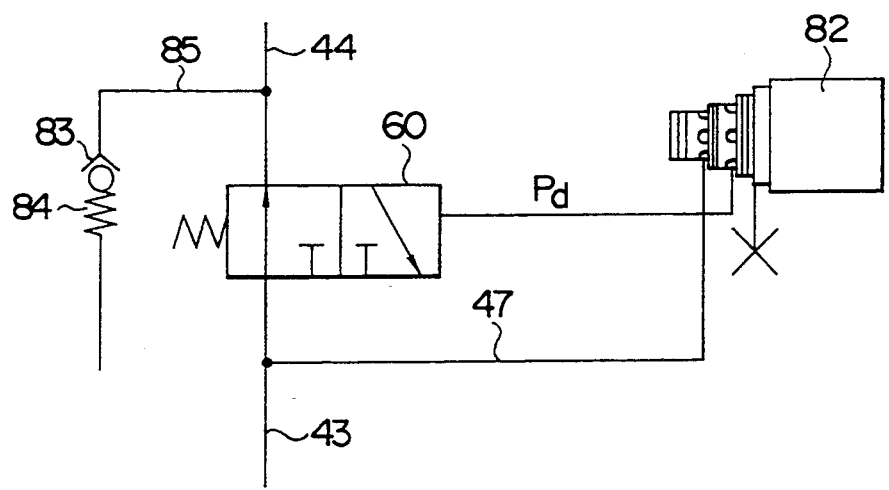
FIG. 5 is a schematic diagram showing principal features of a third embodiment of the present invention.

FIG. 5 shows a third embodiment of the present invention. In this embodiment, a primary control valve 60 varies the amount of oil charged or discharged responsive to a duty pressure Pd supplied from a solenoid valve 82 so as to control the flow rate thereof. In this embodiment, a relief valve 83 is provided on a drain oil path 85 branched from the oil path 44 for the primary cylinder 21. The force of a spring 84 of the relief valve 83 is set in the same way as that of the first embodiment.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system for a continuously variable transmission having a primary pulley operatively connected to an engine, a secondary pulley operatively connected to vehicle wheels, a belt wound around both the primary and secondary pulleys for transmitting power of the engine to the vehicle wheels, a primary cylinder provided on the primary pulley and secondary cylinder provided on the secondary pulley both for adjusting a transmission rate thereof, said control system comprising:

a primary control valve for producing a primary control pressure for the primary cylinder;

a secondary control valve for producing a secondary control pressure for the secondary cylinder;

control means connected to said primary and secondary control valves for changing the primary and secondary control pressures to change the transmission ratio of said transmission;

actuator means provided on said primary control valve for receiving an electric signal from said control means; and setting means for setting maximum primary control pressure of said primary control valve to a predetermined value representing an intermediate transmission ratio between maximum and minimum transmission ratios so as to prevent slipping of said belt and locking of said wheels when electric current stops in said primary control valve due to a malfunction of said system.

2. The control system according to claim 1, wherein: said setting means is resilient means counteracting a decrease of said primary control pressure.

3. The control system according to claim 2, further comprising:
an electromagnetic solenoid responsive to said electric signal for decreasing the primary control pressure, said setting means counteracting the operation of the electromagnetic solenoid.

4. The control system according to claim 3, wherein: said electromagnetic solenoid is of a proportional type.

5. The control system according to claim 4, wherein: said electromagnetic solenoid is of a pilot-type.

6. The control system according to claim 1, wherein: said setting means is a pressure reducing valve connected to said primary control valve for producing a reducing pressure counteracting a decrease of said primary control pressure.

7. The control system according to claim 6, wherein: said pressure reducing valve is connected to an input side of said primary control valve.

8. The control system according to claim 1, wherein: said setting means is a pressure relief valve connected to an output side of said primary control valve for producing a reduced primary control pressure.

* * * * *